United States Patent

[11] 3,537,477

| [72] | Inventor | George A. Mahoff |
| | | Denver, Colorado |
| [21] | Appl. No. | 810,914 |
| [22] | Filed | March 20, 1969 |
| | | Continuation of Ser. No. 610,283, |
| | | Jan. 19, 1967, abandoned. |
| [45] | Patented | Nov. 3, 1970 |
| [73] | Assignee | Gamah Corporation |
| | | a corporation of Colorado |

[54] SELF-SEALING DISCONNECT COUPLING
12 Claims, 3 Drawing Figs.
[52] U.S. Cl.............................................137/614.03,
244/135, 251/149.2
[51] Int. Cl........................................................F16l 37/28
[50] Field of Search............................................137/614.02,
614.03, 614.04; 251/149.1, 149.2; 244/135(A)

[56] References Cited
UNITED STATES PATENTS

| 187,982 | 3/1877 | Pirsson et al................ | 251/149.2 |
| 2,492,271 | 12/1949 | Cox et al..................... | 137/614.03 |
| 2,948,553 | 8/1960 | Gill et al. .................... | 137/614.02 |
| 2,991,090 | 7/1961 | De Cenzo.................... | 137/614.02 |
| 3,279,497 | 10/1966 | Norton et al................. | 251/149.2X |

*Primary Examiner*—Daniel Blum

ABSTRACT: The disclosure concerns tubes coupled together for passing fuel to an aircraft engine, the coupling being such that if the tubes are pulled apart in an accident, the open ends will automatically be closed off by suitable valves which are permitted to close when the tubes are separated. This closing prevents fuel from escaping from the tubes and thereby reduces fire hazard.

Patented Nov. 3, 1970

3,537,477

INVENTOR.
GEORGE A. MAHOFF
BY
Elliott & Pastoriza
ATTORNEYS

3,537,477

SELF-SEALING DISCONNECT COUPLING

This application is a continuation of application Ser. No. 610,283 filed on Jan. 19, 1967 for Self-Sealing Disconnect Coupling, now abandoned.

This invention relates generally to valved pipe couplings, and more particularly to an improved coupling for connecting the coaxial end portions of a pair of tubes and including novel valve means for preventing fluid flow through the tubes upon axial separation of the same.

The prevention of fluid flow through intercoupled tubes or similar conduits, upon separation or uncoupling of the same, is very important in many situations. Among the most important examples is in the coupling of tubes or fuel lines which conduct fuel from the tanks or cells to the engine of an aircraft.

Among today's jet aircraft are those in which the engines are mounted on the aft portion of the fuselage and the fuel cells are mounted within the wings. In such cases, the fuel lines extend from the fuel cells through the wings and then along the fuselage to the engines. The resulting proximity of the fuel lines to the fuselage creates hazards to the passengers which may be greater than in the case where the fuel tanks and engines are mounted within the wings, such that the fuel lines are not located along the fuselage. In the former case, should the aircraft have to make a forced or crash landing, it is possible that the wings may separate from the fuselage thereby causing the fuel lines to be subjected to an axial or tensile force which ruptures the same. The resultant leakage of fuel proximate to the fuselage creates a high degree of danger from fire.

The investigations of several aircraft crashes have indicated that the impact of the aircraft onto the ground was not of sufficient force to have seriously injured the passengers. However, several passengers have been killed by the fires which developed as a result of the rupturing of the fuel lines. Accordingly, it is highly desirable that a means be developed for permitting the fuel lines to separate without permitting fuel to escape from the lines upon separation, thereby greatly decreasing the danger that a fire will develop.

Moreover, it is important that any coupling in the fuel lines system of an aircraft be capable of accommodating thermal expansion and contraction in addition to relative movement of the coupled fuel lines due to vibration and stress induced by normal flight operations.

Along with the important considerations of safety, it is important in aircraft design that the weight, size and complexity of the various components be maintained at the lowest practical limits. Since it is customary to enclose the fuel lines within cylindrical shrouds, it is important that any coupling arrangements in the fuel line system be of a minimum diameter or "envelope" so that the shroud itself may be constructed of a minimum diameter to thus occupy as little area as possible.

With the foregoing in mind, it is accordingly a primary object of this invention to provide a coupling for tubes and the like which prevents flow of fluid through the tubes upon separation or uncoupling of the same.

Another object is to provide a coupling for tubes which permits relative axial and rotative movement of the tubes without becoming disconnected in normal operations.

Another object is to provide a coupling for tubes which is compact in arrangement thereby occupying a minimum area.

Yet another object is to provide a coupling for tubes, which when coupled, provides a uniform uninterrupted passage for fluid to flow therethrough with a minimum of pressure drop.

Briefly, these and many objects and advantages of the invention are obtained by providing means for connecting first and second tubes in such a manner as to permit relative rotative and axial movement of the tubes when in connected relation. The first tube may include a tubular member defining a first end portion of the tube and a sleeve member coupled to the tube surrounding the end portion to define an annular space therebetween. The sleeve member extends axially beyond the first end portion and includes a first valve means for closing the sleeve member in a manner to be described.

The second tube includes a cylindrical member defining a second end portion which is receivable within the above-mentioned annular space defined between the sleeve and the first end portion. When so positioned, the second end portion holds the first valve means in an open position.

A second valve means is mounted in the second end portion so as to be receivable within the above-mentioned annular space wherein the second valve means is held in an open position against the first end portion of the first tube.

The second tube may include a conduit member secured within the second end portion for telescopically receiving the first end portion of the first tube to provide a uniform flow path between the tubes through the coupling, while permitting relative rotative and axial movement of the tubes.

The first valve means is designed to close the first end portion, and the second valve means is designed to close the second end portion in response to axial movement of the second end portion out of the sleeve to thus prevent fluid flow through the tubes when the same are uncoupled.

A better understanding of the invention will now be had by referring to a preferred embodiment thereof as shown in the accompanying drawings, in which.

Figure 1:
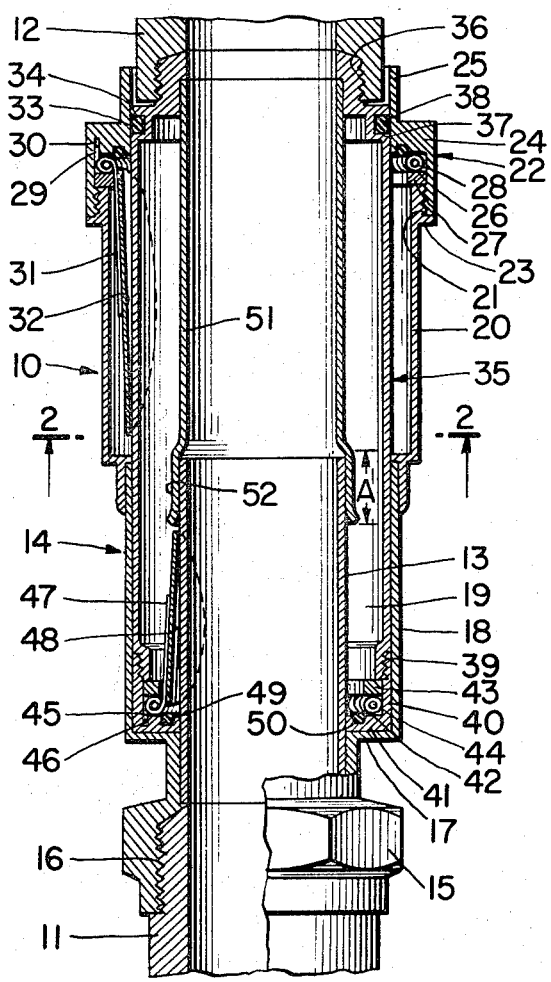
FIG. 1 is a sectional view of the coupling of the invention illustrating a pair of tubes being held in coupled relation.

Referring first to FIG. 1, there is shown a coupling assembly 10 for connecting a first tube 11 and a second tube 12. The coupling 10 includes a tubular member 13 which comprises the first end portion of the tube 11. The member 13 includes an inner diameter the same as that of the tube 11 and extends coaxially therefrom.

The member 13 may be secured within a sleeve 14 which includes an integral nut portion 15 for threadedly coupling the sleeve onto the first tube 11 as shown at 16. The sleeve 14 includes an annular end wall 17 which is joined to a first cylindrical portion 18 which extends around the member 13 to define an annular space 19 therebetween. The sleeve 14 further includes a second cylindrical portion 20 of increased diameter secured on an end of the first cylindrical portion 18 and extending coaxially therefrom.

The sleeve 14 is adapted to receive a first valve means for closing the sleeve to prevent fluid flow from the first tube 11 as will be described. Toward that end, the cylindrical portion 20 of the sleeve 14 terminates in a threaded portion 21 for threadedly receiving a collar 22 which may abut against an annular flange 23 formed on the periphery of the sleeve 14. The collar 22 includes an annular end wall 24 which is joined to a cylindrical sleeve portion 25 having an inner diameter substantially the same as that of the cylindrical portion 18 of the sleeve 14.

The first valve means further includes an annular coil spring 26 retained within the collar 22 by a snap ring 27. In order to insure that the spring 26 retains its annular configuration, a ring 28 may be positioned within the spring 26 as shown. The coil spring 26 includes an end 29 projecting into a recess 30 defined in the annular end wall 24 of the collar 22. The spring 26 further includes another end 31 secured to a semiflexible circular disc 32. As will be described subsequently in greater detail, the disc 32 is adapted to pivot into engagement with an O-ring 33 positioned in an annular groove 34 defined in the end wall 24 of the collar 22.

Referring still to FIG. 1, it will be seen that a cylindrical member 35 is threadedly coupled at 36 to the second tube 12 so as to form an extension or a second end portion of the second tube 12. The member 35 includes an annular groove 37 receiving an O-ring 38 for sealingly engaging the collar 22. As shown, the member 35 is designed to be slidably received within the annular space 19 defined between the sleeve 14 and the tubular member 13.

The member 35 is adapted to receive a second valve means for closing the same to prevent fluid flow from the second tube 12 as will be described. Toward that end, the member 35 terminates in a threaded portion 39 for threadedly receiving a collar 40 which terminates in an annular end wall 41. The second valve means includes an annular coil spring 42 retained within the collar 40 by a snap ring 43. In order to ensure that the spring 42 retains its annular configuration, a ring 44 may be disposed within the spring 42 as shown. The coil spring 42 includes an end 45 projecting into a recess 46 defined in the annular end wall 41 of the collar 40. The spring 42 further includes another end 47 secured to a semiflexible circular disc 48. As will be described subsequently in greater detail, the disc 48 is adapted to pivot into engagement with an O-ring 49 positioned in an annular groove 50 defined in the end wall 41 of the collar 40.

When the tubes 11 and 12 are coupled as shown in FIG. 1, fluid may flow through the coupling with a minimum of pressure drop. Toward that end, a cylindrical conduit 51 is secured within the cylindrical member 35 so as to extend coaxially from the second tube 12. The inner diameter of a substantial portion of the conduit 51 is the same as that of the tube 12. As shown, the conduit 51 terminates in an increased diameter portion 52 for slidably receiving an end portion of the cylindrical member 13. It will thus be seen that the interfitting members 13 and 51 provide a flow path of substantially uniform diameter which permits fluid flow with a minimum of pressure drop within the coupling. Moreover, it will be seen that the interfit of the members 13 and 51 permits the tubes 11 and 12 to move axially with respect to each other a distance substantially equal to the axial extent of the increased diameter portion 52, as shown by the distance A.

Figure 2:
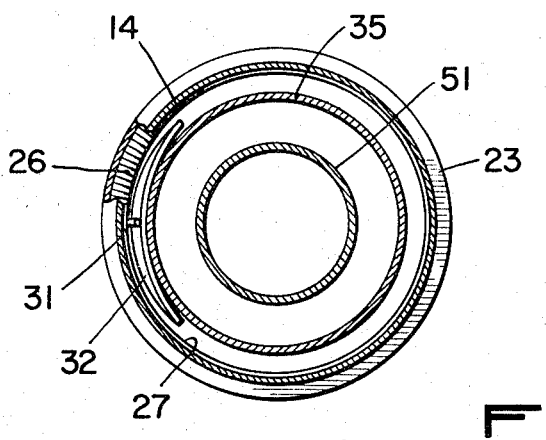
FIG. 2 is a sectional view taken in the direction of arrows 2–2 of FIG. 1.

FIG. 2 illustrates the manner in which the disc 32 of the first valve means is retained in an open position by virtue of its engagement against a portion of the periphery of the cylindrical member 35 when the tubes are in coupled relation.

Figure 3:
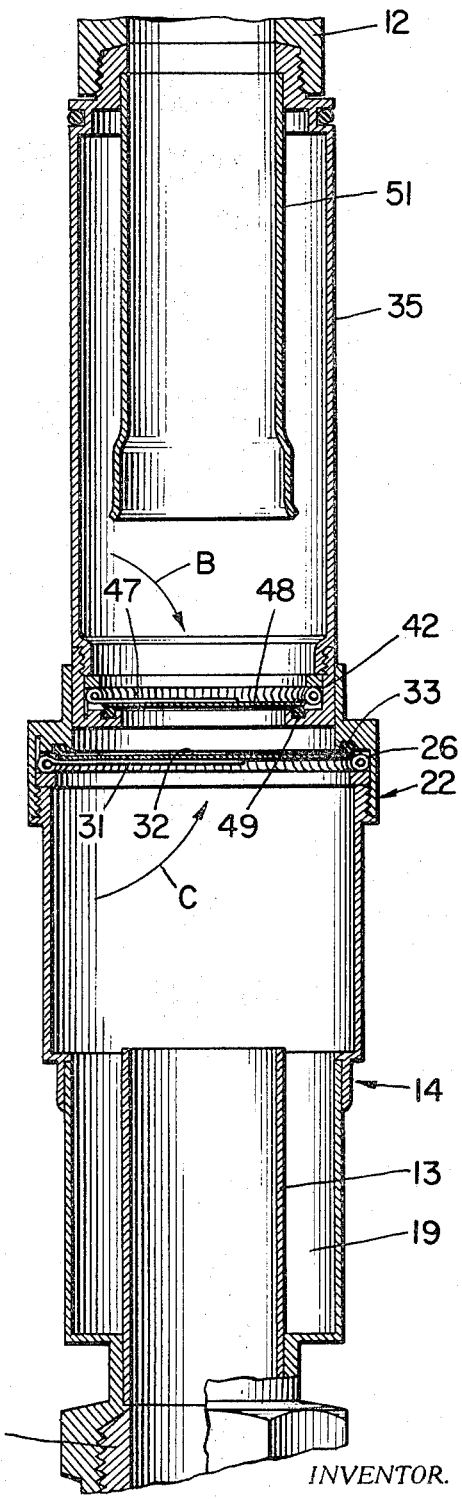
FIG. 3 is a sectional view of the coupling of the invention illustrating the tubes in an unconnected or uncoupled position.

FIG. 3 illustrates the closed positions of the first and second valve means upon axial separation of the tubes as will be described with reference to the operation of the invention.

In operation, and with reference first to FIG. 1, the tubes 11 and 12 are shown in coupled relation wherein fluid may flow therebetween through the interfitting members 13 and 51. When coupled as shown, it will be seen that the disc 32 of the first valve means is biased by the spring 26 into an arcuate configuration against the cylindrical member 35 thus holding the first valve means in an open position. As best shown in FIG. 2, the disc 32 assumes its arcuate configuration due to the flexibility of the same which provides the important advantage of accommodating itself within the annular space between the member 35 and the sleeve 14. Accordingly, it will be appreciated that the overall cross-sectional area of the coupling will be significantly less than if the disc were a rigid member.

In the same manner, it will be seen in FIG. 1 that the spring 42 biases the disc 48 into an arcuate configuration against a portion of the periphery of the member 13. Accordingly, the disc 48 is accommodated within the annular space 19 with the resultant decrease in cross-sectional area of that portion of the coupling.

The coupling arrangement of the invention accommodates relative coaxial rotation of the tubes should such movement be required while the tubes are coupled. As a corollary factor, it will be appreciated that the tubes need be simply coaxially aligned to couple the same without requiring any further particular orientation.

Moreover, the coupling arrangement permits the tubes to move axially with respect to each other through the distance A without becoming uncoupled. Accordingly, the flow path through the coupling is maintained even if the tubes are coupled respectively to members which are relatively movable.

As above mentioned, the coupling of the invention is designed to prevent fluid flow upon axial separation of the tubes. With reference to FIGS. 1 and 3, it will be seen that the tubes 11 and 12 are moved axially away from each other, the member 35 will be withdrawn from the annular space 19. As this movement continues, the force of the spring 42 will pivot the disc 48 in the direction of arrow B (FIG. 3) into sealing engagement with the O-ring 49 as the disc 48 and associated valve structure clear the end of the tubular member 13. The end of the member 35 is thus closed to prevent fluid flow from the tube 12 as will be seen in FIG. 3. As the axial movement continues, the spring 26 of the first valve means will bias the disc 32 in the direction of arrow C (FIG. 3) into sealing engagement with the O-ring 33 as the collar 40 clears the annular wall 24 of the collar 22. The end of the sleeve 14 is thus closed to prevent fluid flow from the first tube 11 as will be seen in FIG. 3. Since the valve closed position and the valve opened position of disc 32 are respectively on opposite sides of spring 26 as shown in FIGS. 1 and 3, it is clear from the foregoing description that disc 32 passes through the space delimited by spring 26 as it is pivoted between its valve opened and valve closed positions. This, of course, requires that the internal diameter of spring 26 be greater than the diameter of disc 32 as shown in the drawings. Also, since the valve closed position and valve opened position of disc 48 are respectively on opposite sides of spring 42 as shown in FIGS. 1 and 3, it is clear from the foregoing description that disc 48 passes through the space delimited by spring 42 as it is pivoted between its valve closed and valve opened positions. This requires that the internal diameter of spring 42 be greater than the diameter of disc 48 as shown in the drawings.

It will be appreciated that the springs 26 and 42 of the first and second valve means respectively, combine the functions of a hinge and a spring for the disc 32 and 48 respectively. The pivoting and biasing force is derived from the "winding up" or torsion of the spring when the discs are held in their open positions in FIG. 1.

From the foregoing, it is apparent that the coupling means of the invention provides a simplified and compact arrangement. The coupling is designed to accommodate limited relative movement of the tubes when coupled, and further, prevents flow of fluid from the tubes upon uncoupling of the same. It will thus be appreciated that the coupling arrangement of the invention is particularly well adapted for use in the fuel line system of an aircraft for example. However, it will be understood that the invention may be utilized in a variety of operational environments.

Various changes falling within the scope and spirit of the invention will occur to those skilled in the art. The invention is therefore not to be thought of as limited to the specific embodiment set forth.

I claim:

1. A valved coupling for connecting a pair of tubes, comprising:
   a. a first tube having a first end portion;
   b. a sleeve mounted on said first tube and surrounding said first end portion to define an annular space therebetween;
   c. a second tube having a second end portion telescopically receivable within said annular space;
   d. a semiflexible circular disc valve mounted in said sleeve; and
   e. an annular coil spring mounted within said sleeve with one end pivotally coupled to said disc valve and another end secured to said sleeve, the coil being arranged to bias said disc valve into an arcuate configuration against a portion of the periphery of said second end portion to thereby retain the disc valve in its opened position, whereby said disc valve is pivotable to a position closing said sleeve in response to the tortional force of said spring upon axial movement of said second end portion out of said sleeve.

2. A valved coupling for connecting a pair of tubes, comprising:
   a. a first tube having a first end portion;
   b. a sleeve mounted on said first tube and surrounding said first end portion to define an annular space therebetween;
   c. a second tube having a second end portion telescopically receivable within said annular space;
   d. first valve means including a semiflexible circular disc valve mounted in said sleeve;

e. an annular coil spring mounted within said sleeve with one end pivotally coupled to said disc valve and another end secured to said sleeve, the coil being arranged to bias said disc valve into an arcuate configuration against a portion of the periphery of said second end portion to thereby retain the disc valve in its open position; and f. second valve means mounted in said second end portion and being held in an opened position by said first end portion, whereby upon axial movement of said second end portion out of said sleeve said disc valve is pivotable to a position closing said sleeve in response to the tortional force of said spring, and, said second end portion is closed by said second valve means.

3. A valve coupling for connecting a pair of tubes comprising:

a. a first tube having a first end portion;

b. a sleeve mounted on said first tube and surrounding said first end portion to define an annular space therebetween;

c. a second tube having a second end portion telescopically receivable within said annular space;

d. first valve means mounted in said sleeve and being held in an opened position by said second end portion;

e. second valve means including a semiflexible circular disc valve mounted in said second end portion; and f. an annular coil spring mounted within said second end portion with one end pivotally coupled to said disc valve and another end secured to said second end portion, the coil being arranged to bias said disc valve into an arcuate configuration against a portion of the periphery of said first end portion to thereby retain the disc valve in its opened position, whereby upon axial movement of said second end portion out of said sleeve said sleeve is closed by said first valve means and said disc valve is pivotable to a position closing said second end in response to the tortional force of said spring.

4. A valved coupling for detachably interconnecting a pair of fluid flow lines and comprising a pair of longitudinally separable coupling units adapted for connection one to each of said flow lines, one of said units comprising a part which defines a passage for fluid flowing through the assembly of said units, and the other of said units comprising a body axially separably and telescopically receiving said part when said units are in assembled relation to interconnect said flow lines, an annular seat defined around the interior of said body, a disc valve for said seat, and annular means disposed around the interior of said body axially adjacent to said seat for biasing said disc valve into said engagement with said seat to seal said body against outward flow of fluid therefrom when said body and said part are axially separated, the internal diameter of said annular means being greater than the diameter of said disc valve, said part being engageable with said disc valve upon telescopic movement of said part into said body for urging said disc valve through the space delimited by said annular means and to a valve opened position on the side of annular means that is axially opposite from the side adjacent to said seat.

5. The valved coupling defined in claim 4 wherein annular means comprises an annular coil spring having opposite ends respectively secured to said disc valve and said body for tortionally biasing said disc valve (a) into engagement with the outer periphery of said part when the latter is received in said body and (b) into engagement with said seat upon axial separation of said part from said body.

6. The valved coupling defined in claim 5 wherein said body is formed with a wall mounting said seat and extending radially of the axis along which said body and part are axially separable, said wall being formed with a central opening through which said part is inserted into and removed from said body.

7. The valved coupling defined in claim 6 comprising an annular part positioned within said body in axial spaced, opposed relation to a radial surface of said wall, said spring being confined between said surface and said annular part.

8. The valved coupling defined in claim 7 wherein said wall is formed with an annular groove extending inwardly from said surface and opening axially in alignment with the longitudinal axis of said spring, said seat comprising an elastically deformable ring seated in said groove, and the inner diameter of said spring being at least as large as the outer diameter of said ring.

9. A valved coupling for detachably interconnecting a pair of fluid flow conduits and comprising first and second sleeve members adapted for connection one to each of said flow lines, first and second passage-forming members respectively fixed to and peripherally surrounded by said first and second sleeves, the end portions of said first and second sleeves remote from the connections to said flow lines, extending axially beyond said first and second members respectively, said sleeves upon assembly to interconnect said flow lines being separably telescoped one within the other, and said members being engaged with each other to define a flow passage through the assembly of said sleeves upon predetermined telescoping movement of one sleeve relative to the other, first valve means mounted within said end portion of said first sleeve in axially spaced relation to said first member, second valve means mounted in said end portion of said second sleeve in axially spaced relation to said second member, and means biasing said first and second valve means to closed positions where they respectively block outward flow of fluid from the assembly of said first sleeve and said first member and the assembly of said second sleeve and said second member, said first sleeve being engageable with said second valve means when said sleeves are telescopically assembled to actuate said second valve means to an opened position where it allows fluid to flow through said passage, and said second member being engageable with said first valve means when said sleeves are telescopically assembled to actuate said first valve means to a position when it allows fluid to flow through said passage.

10. A valved disconnect coupling for detachably interconnecting a pair of fluid flow lines and comprising first and second longitudinally separable coupling units respectively having first and second fluid flow passage defining members adapted for separable engagement to define a fluid flow passage through the assembly of said units, first and second sleeves respectively forming parts of said first and second units and being telescoped one within the other upon assembly of said coupling units, said first sleeve being fixed to and peripherally surrounding said first member, and said second sleeve being fixed to and peripherally surrounding said second member, first and second valve members respectively forming parts of said first and second units and being respectively mounted within said first and second sleeves for pivotal movement about axes extending transversely of the longitudinal axes of their respective coupling units, and means biasing said first and second valve members to valve closed position where they block flow of fluid respectively through said first and second passage-defining members when said first and second units are longitudinally separated, said first passage-defining member being engageable with said second valve member upon assembly of said coupling units to urge said second valve member to a valve-opened position where it is disposed out of said passage and between said first passage-defining member and said second sleeve, and said second sleeve being engageable with said first valve member upon assembly of said coupling units to urge said second valve member to a valve-opened position where it is disposed out of said passage and between said first and second sleeves.

11. The valved disconnect assembly defined in claim 10 wherein said first and second valve members are valve closure discs.

12. The valved disconnect assembly defined in claim 10 wherein said first and second passage-defining members cooperate to provide said passage with a substantially uniform diameter from one end of the passage to the other.